(12) United States Patent
Gougeon et al.

(10) Patent No.: US 11,383,654 B2
(45) Date of Patent: Jul. 12, 2022

(54) SUPPORT DEVICE FOR A NOMAD ELECTRONIC DEVICE COMPRISING A BLOCKING DEVICE

(71) Applicant: FAURECIA INTERIEUR INDUSTRIE, Nanterre (FR)

(72) Inventors: Fabien Gougeon, Franconville (FR); Julien Aussietre, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 17/197,024

(22) Filed: Mar. 9, 2021

(65) Prior Publication Data
US 2021/0284080 A1    Sep. 16, 2021

(30) Foreign Application Priority Data
Mar. 10, 2020 (FR) ...................... 20 02356

(51) Int. Cl.
*B60R 11/02* (2006.01)
*B60R 11/00* (2006.01)

(52) U.S. Cl.
CPC ... *B60R 11/0241* (2013.01); *B60R 2011/0071* (2013.01); *B60R 2011/0078* (2013.01)

(58) Field of Classification Search
CPC . B60R 11/02; B60R 11/0235; B60R 11/0241; B60R 11/0252; B60R 11/0276; B60R 11/0294; B60R 2011/0071; F16M 11/041
USPC ..................................................... 248/316.4
See application file for complete search history.

(56) References Cited

U.S. PATENT DOCUMENTS

| | | | |
|---|---|---|---|
| 6,085,113 A | 7/2000 | Fan | |
| 7,537,190 B2 * | 5/2009 | Fan | H04B 1/3877 379/426 |
| 7,614,595 B2 * | 11/2009 | Richter | B60R 11/0241 379/446 |
| 9,278,653 B2 * | 3/2016 | Da Costa Pito | B60R 11/0258 |
| 9,821,723 B2 * | 11/2017 | Mannarino | B60R 11/02 |
| 10,086,771 B2 * | 10/2018 | Barre | B60R 11/02 |

(Continued)

FOREIGN PATENT DOCUMENTS

| | | |
|---|---|---|
| DE | 29822428 U1 | 4/1999 |
| DE | 202012003628 U1 | 7/2012 |
| EP | 1262370 A1 | 12/2002 |

OTHER PUBLICATIONS

French Search Report corresponding to French Application No. FR 2002356, dated Jun. 30, 2020, 2 pages.

*Primary Examiner* — Justin M Larson
(74) *Attorney, Agent, or Firm* — Reising Ethington P.C.

(57) ABSTRACT

A support device having a receiving surface, a first holding element and a second holding element, the first holding element being movable relative to the receiving surface, the support device including a blocking device having at least one blocking element movable between a release position and at least one blocking position and further including at least one constraint element urging the blocking element towards its release position. The blocking element moves towards its blocking position when the support device is subjected to a blocking acceleration greater than or equal to a predetermined acceleration. The blocking element interacts with a blocking surface in the blocking position.

10 Claims, 5 Drawing Sheets

(56) References Cited

U.S. PATENT DOCUMENTS

| | | | | |
|---|---|---|---|---|
| 10,343,778 B2* | 7/2019 | Peuziat | ............... | F16M 11/14 |
| 10,833,716 B2* | 11/2020 | Beauregard | ......... | H04B 1/3822 |
| 11,025,762 B2* | 6/2021 | Ackeret | ............. | F16M 11/041 |
| 11,142,134 B2* | 10/2021 | Yamada | ............. | F16M 11/2021 |
| 2006/0183511 A1* | 8/2006 | Shen | ..................... | H04M 1/04 |
| | | | | 455/575.1 |
| 2019/0390692 A1* | 12/2019 | Li | ........................ | F16M 11/041 |
| 2021/0253037 A1* | 8/2021 | Maddali | ............. | B60R 11/0235 |

* cited by examiner

SUPPORT DEVICE FOR A NOMAD ELECTRONIC DEVICE COMPRISING A BLOCKING DEVICE

TECHNICAL FIELD

The present invention relates to a support device for a nomad (portable) electronic device for a vehicle, of the type comprising a receiving surface for the nomad electronic device, a first holding element and a second holding element arranged to be applied against two opposite edges of the nomad electronic device respectively to hold said nomad electronic device on the receiving surface, with at least the first holding element being movable relative to the receiving surface so that the distance between the first holding element and the second holding element is adjustable, the holding device further comprising a blocking device comprising at least one blocking element movable between an unblocking position, wherein movement of the first holding element relative to the receiving surface is permitted, and at least one blocking position, in which movement of the first holding element relative to the receiving surface is prevented, with the blocking device further comprising at least one constraint element exerting a urging force on the blocking element urging the blocking element to its unblocking position, the blocking element moving to its blocking position against the urging force exerted by the constraint element when the support device is subjected to a blocking acceleration greater than or equal to a predetermined acceleration.

BACKGROUND

Providing a support device for a nomad electronic device in the passenger compartment of a vehicle is well known. Such a support device allows a user to place a nomad electronic device on the support device so that the device can be used or viewed ergonomically without the user having to hold the nomad electronic device. Such a nomad electronic device is a computer (or smartphone), a touch surface such as a touch pad or other, for example. More generally, such a support device is suitable for any nomad electronic device comprising a screen with a touch surface allowing the nomad electronic device to be controlled by touching the touch surface. Such a support device must therefore be designed to allow the nomad electronic device to be held while leaving the screen visible and accessible. In addition, the support device must also be adapted to accommodate nomad electronic devices of varying sizes and in different orientations, such as a "portrait" position and a "landscape" position.

For this purpose, the support device typically comprises two holding elements, such as jaws, arranged to be applied against two opposite edges of the nomad electronic device to hold the device between the holding elements while leaving the screen accessible. At least one of the holding elements is also movable relative to the other holding element so that the distance between the holding elements is adaptable to the size or orientation of the nomad electronic device received on the support device. To ensure a firm hold on the nomad electronic device and automatic adaptation to its dimensions or orientation, a constraint element, such as one or more springs, urges the movable holding element towards the other holding element so that the movable holding element tends to move towards the other holding element when it is moved away from it. In this way, the movable holding element is urged against the edge of the corresponding nomad electronic device, which improves the holding of the device.

However, when the supporting device is subjected to a too important acceleration, for example during an impact against the vehicle, the urging force exerted by the constraint element can be overcome, causing the movable holding element to move away from the edge of the nomad electronic device against which it normally rests. The nomad electronic device is then no longer held and is likely to be ejected into the vehicle interior, which could damage it or even injure a vehicle occupant.

To overcome this drawback, the constraint element can be sized to exert a sufficient urging force to resist this separation. However, in this case, the force required to spread the holding element to place a device on the support device becomes too great for a user, making the use of the support device uncomfortable.

SUMMARY

One of the objects of the invention is to overcome this drawback by providing a support device adaptable to different types of nomad electronic devices while ensuring a firm hold of the received device in all circumstances.

To this end, the invention relates to a support device of the aforesaid type, in which the blocking element interacts with a blocking surface in the blocking position, said blocking surface comprising multiple complementary blocking elements spaced from each other along the direction of movement of the first holding element, with the blocking element interacting with at least one of said complementary blocking elements in the blocking position so as to prevent movement of the first holding element relative to the receiving surface regardless of the position of the first holding element relative to the receiving surface.

The blocking device makes it possible to ensure the continuity of the holding of the nomad electronic device in all positions of the first holding element, including when the first holding element tends to move away from the edge of the nomad electronic device under the effect of too great an acceleration. The blocking device only operates when necessary, thus reducing the effort required to move the first holding element when a nomad electronic device is placed on the holder and makes the use of the holder device ergonomic.

The following optional features of the support device may be included either alone or in any technically feasible combination:
- the first holding element is movable in translation relative to the receiving surface, the blocking device being translationally movable with the first holding element so as to allow blocking of the movement of the first holding element with respect to the receiving surface in all positions of the first holding element when the support device is subjected to a blocking acceleration;
- the complementary blocking elements of the blocking surface are spaced from each other in the direction of the translation movement of the first holding element;
- the blocking element is rotatable about an axis of rotation relative to the first holding element between the unblocking position and the blocking position so that the free end of the blocking element opposite the rotation axis approaches the blocking surface as the blocking element moves from the unblocking position to the blocking position;

- the blocking element comprises a reinforcing element extending between the rotation axis and the free end of the blocking element, said reinforcing element being spaced from the rotation axis to adjust the position of the center of gravity of the blocking element relative to the rotation axis as a function of the urging force exerted by the constraint element on the blocking element.
- the constraint element is mounted on at least one pin of the first holding element extending opposite a central portion of the blocking element between the rotation axis and the free end of the blocking element, the constraint element comprising a urging arm exerting the urging force on the free end of the blocking element;
- the blocking element comprises at least one pin rotatably mounted in a groove of the first holding element about the rotation axis of the blocking element;
- the support device comprises a biasing element urging said first holding element towards a position close to the receiving surface, the movement of the first holding element, to move it away from the receiving surface, being against the urging force exerted by said biasing element on the first holding element;
- the second holding element is fixed relative to the receiving surface and extends beyond one edge of said receiving surface, the first holding element being movable relative to the opposite edge of the receiving surface; and
- the blocking acceleration is greater than or equal to 7G.

BRIEF DESCRIPTION OF THE DRAWINGS

Other aspects and advantages of the invention will appear when reading the following description, given as an example and made with reference to the attached drawings, in which.

DETAILED DESCRIPTION

Figure 1:
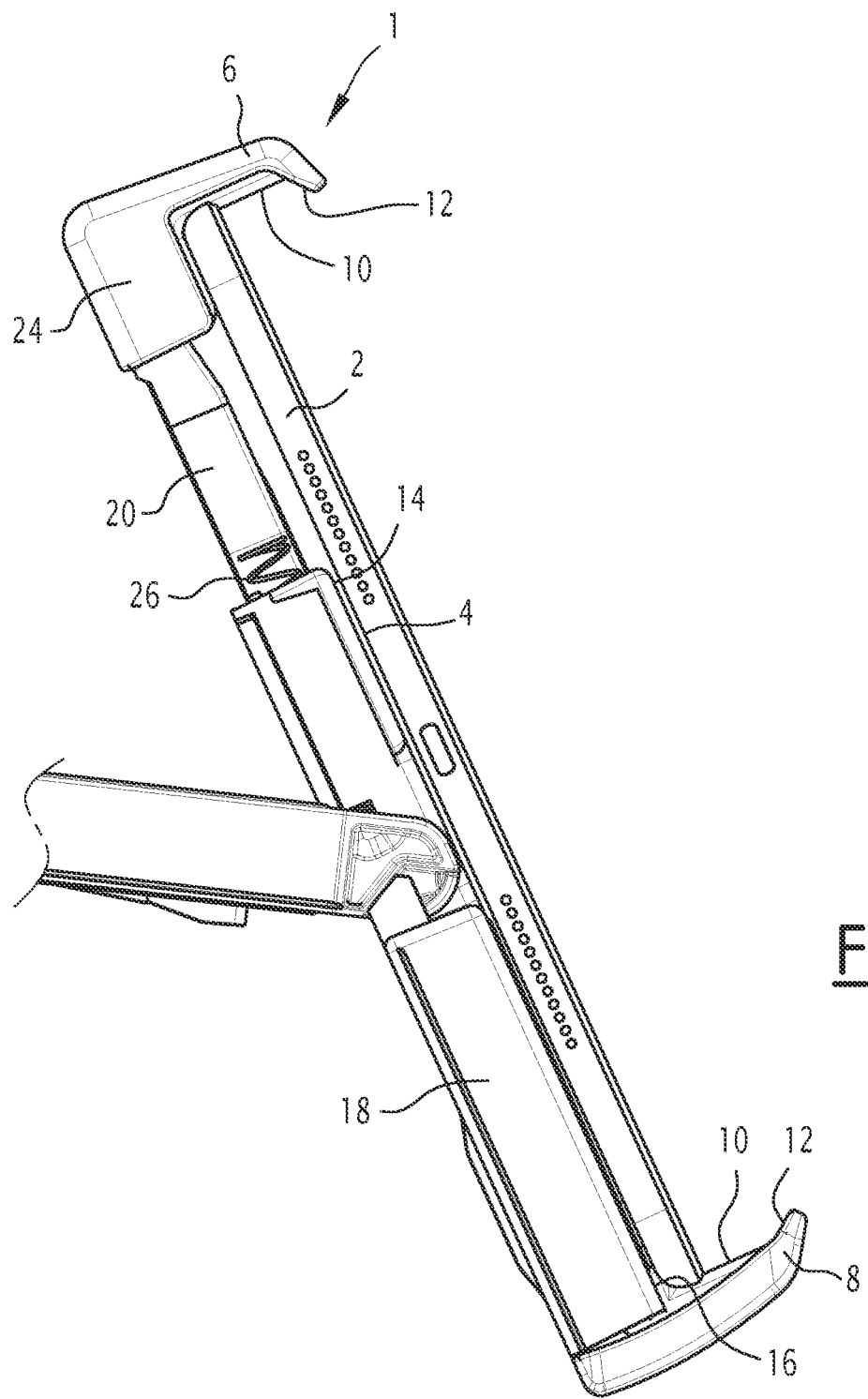
FIG. 1 is a diagrammatical side view of a support device according to an embodiment of the invention receiving a nomad electronic device.

With reference to FIG. 1, a support device 1 of a nomad electronic device 2 is described, which is intended to be placed in a vehicle interior. Such a support device is, for example, integrated into a vehicle trim element, such as a center console, dashboard or door panel, or is intended to be attached to a trim element or any other part of the vehicle interior, such as the windshield etc.

The support device 1 comprises a receiving surface 4 of the nomad electronic device 2 and at least a first holding element 6 and a second holding element 8 of the nomad electronic device 2 on the receiving surface 4.

The receiving surface 4 is arranged to receive the nomad electronic device 2 so that at least part of the device 2 extends over the receiving surface 4 with its display facing outwards from the support device 1, opposite the receiving surface 4. In others words, when a nomad electronic device 2 is received on the receiving surface 4, the back of the device is at least partly applied against the receiving surface 4.

The first element 6 and the second element 8 are arranged to hold the nomad electronic device 2 on the receiving surface 4 by being applied against two opposite edges of the nomad electronic device 2 when the nomad electronic device 2 is received on the receiving surface 4. Opposite edges are defined as parts of the contour of the nomad electronic device 2 that extend on both sides of the screen and the back of the nomad electronic device 2. In particular, when the nomad electronic device 2 is received in a portrait position in which the screen is oriented substantially in the direction of vehicle elevation, the edges of the device against which the first and second holding elements 6, 8 are applied are the lower and upper edges of the nomad electronic device 2, as shown in FIG. 1. When the nomad electronic device 2 is received in a landscape position in which the display is oriented substantially in a transverse direction of the vehicle, the edges of the device against which the first and second holding elements 6, 8 are applied are the side edges of the nomad electronic device 2 joining the lower and upper edges.

The first and second holding elements 6, 8 are shaped to ensure holding the nomad electronic device 2 when applied to two opposite edges of the device. For this purpose, each holding element comprises a holding surface 10, extending substantially perpendicular to the receiving surface 4, with the holding surfaces 10 of the first and second holding elements 6, 8 extending opposite each other. To further improve the hold, the first and second holding elements 6, 8 may each additionally comprise a shoulder, or protrusion, 12 extending at the free end of the corresponding holding surface 10 opposite the receiving surface 4 so as to retain the nomad electronic device 2 if it were to tilt away from the receiving surface 4. The distance between the receiving surface 4 and the shoulders, or protrusions, 12, corresponding to the length of the holding surfaces 10, is chosen, for example, so that nomad electronic devices 2 of varying thickness can be received by the holding device 1.

The first and second holding elements 6, 8 extend on either side of the receiving surface 4. According to the embodiment shown in the figures, the first and second holding elements 6, 8 extend in particular opposite the upper edge 14 and lower edge 16 of the receiving surface 4, respectively, considered in the direction of elevation of the vehicle when the support device 1 is installed in the vehicle. According to the embodiment shown in FIG. 1, the second holding element 8 is firmly connected to the receiving surface 4 and forms the lower edge 16 of the receiving surface 4. It is understood that in some embodiments the invention can also be applied to holding elements extending opposite the side edges of the receiving surface 4.

Figure 2:
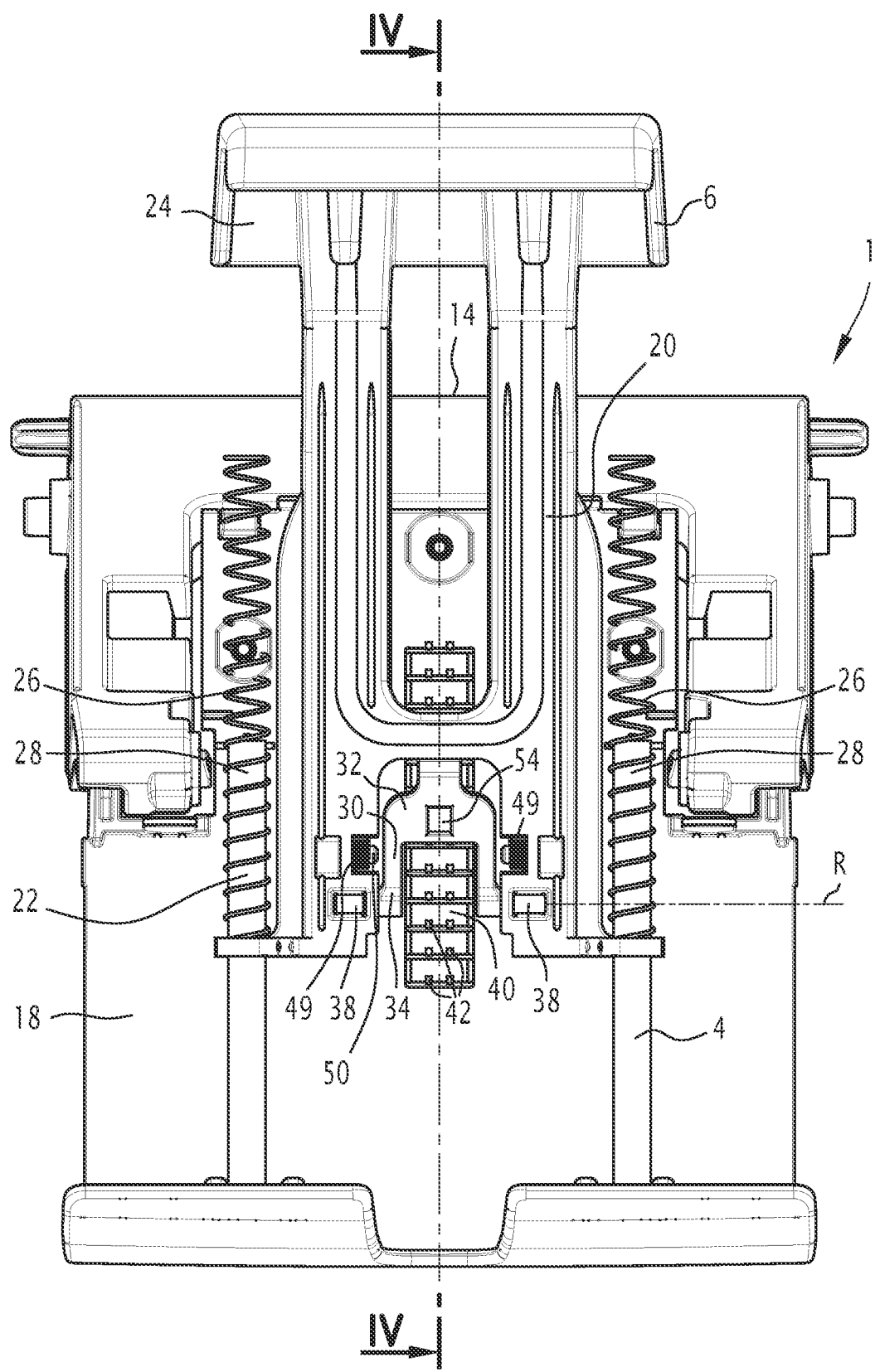
FIG. 2 is a diagrammatical front view of part of the support device in FIG. 1.

The first holding element 6 is movable relative to the receiving surface 4 and relative to the second holding element 8 so as to allow changing the distance between the first holding element 6 and the second holding element 8. More particularly, the movement of the first holding element 6 results in a change in the distance between the holding surfaces 10 of the first and second holding elements 6, 8. Thus, for example, the first holding element 6 is translationally movable relative to the receiving surface 4 so that it can be moved away from or towards the upper edge 14 of the receiving surface 4. The distance between the holding surfaces 10 can therefore be adjusted to the distance between the opposite edges of the nomad electronic device 2 against which the first and second holding elements 6, 8 are supported. Thus, the holding device 1 can accommodate nomad electronic devices of different sizes and/or can hold the same nomad electronic device 2 in both portrait and landscape position. For example, the first holding element 6 is slidably mounted in a body 18 of the support device 1, which forms the receiving surface 4. For this purpose, the first holding element 6 comprises a sliding element 20, slidably mounted in a sleeve 22 formed in the body 18, as shown in FIGS. 2 to 5. At one end, extending out of the sleeve 22, the sliding element 20 carries a jaw 24, defining the holding surface 10 and the shoulder, or protuberance, 12, as shown in FIGS. 1 and 2. The jaw 24 extends, for example, substantially perpendicularly to the sliding element 20.

Figure 3:
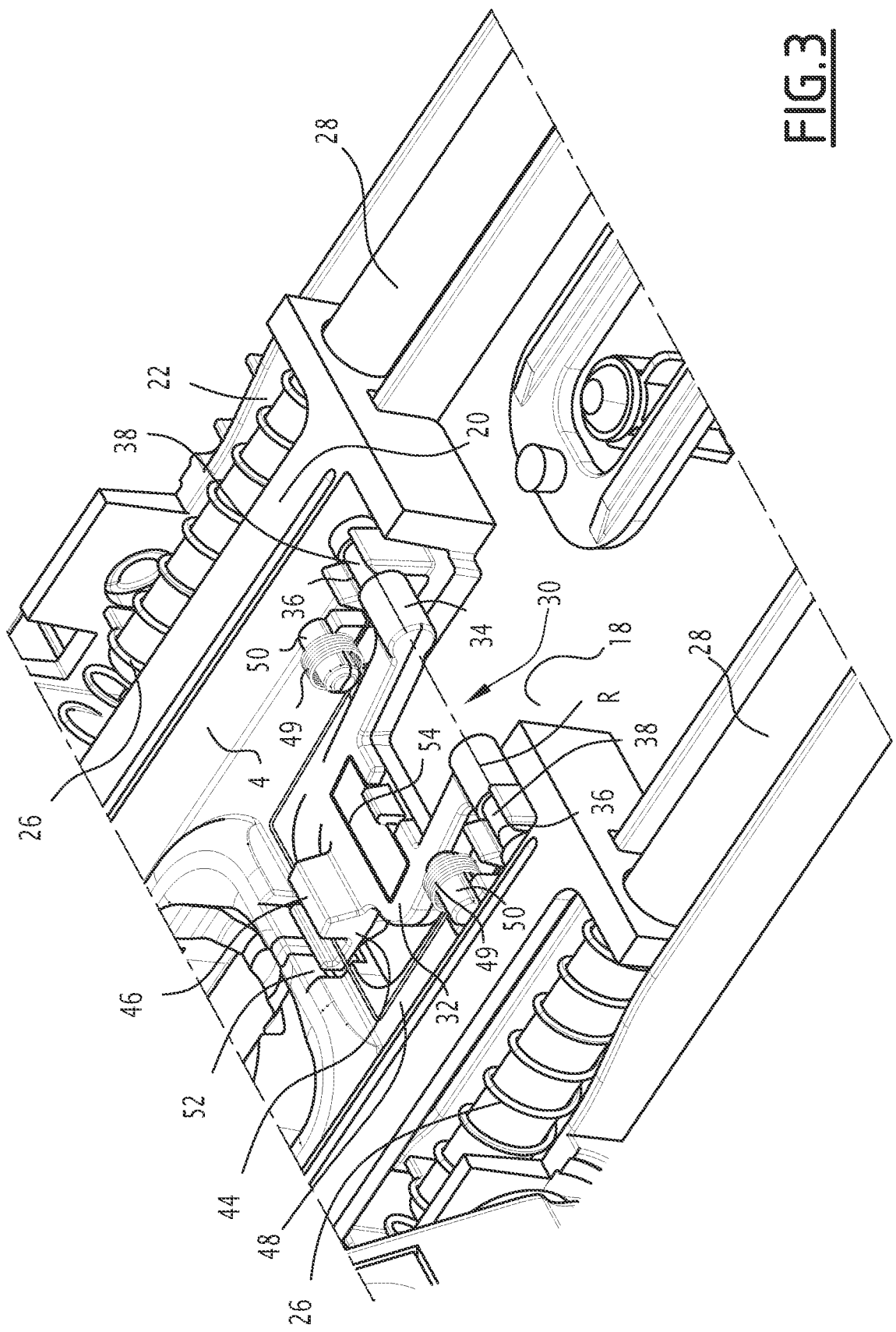
FIG. 3 is a diagrammatical back view of part of the support device in FIG. 1.

According to one embodiment, the first holding element 6 is urged towards a position close to the second holding element 8. "Urged towards a close position" means that the first holding element 6 tends to move towards the second holding element 8 when it is moved away from the second holding element 8 by moving the jaw 24 away from the receiving surface 4. The close position is, for example, a position in which the holding surface 10 of the first holding element 6 extends along the upper edge 14 of the receiving surface 4. The urging of the first holding element 6 is exerted by at least one return element 26 (FIG. 3), which extends, for example, between the sliding element 20 and the sleeve 22 and stretches when the first holding element 6 is moved away from the receiving surface 4. Alternatively, the return element is compressed when the first holding element 6 is moved away from the receiving surface 4. As shown in FIG. 3, the return element 26 is, for example, formed by a helical spring which extends around a rod 28 attached to the sleeve 22 and around which the sliding element 20 moves when the first holding element 6 is moved. According to the embodiment shown in FIG. 3, two return elements 26 are arranged to urge the first holding element 6 towards the close position. Since the return element(s) 26 serves only to urge the first holding element 6 towards the close position so that the nomad electronic device 2 is effectively held when it is received on the receiving surface 4 under normal vehicle operation, the return elements 26 can be sized to perform this function without being oversized to additionally hold the nomad electronic device 2 in the event of strong acceleration applied to the support device, such as during an impact on the vehicle. Thus, the movement of the first holding element 6 against the urging force applied by the return element(s) 26 does not require too much effort for a user who wishes to move the first holding element 6 away in order to place or remove a nomad electronic device on or from the receiving surface 4. 'Sizing' means the selection of at least one feature of the return element 26, such as its stiffness.

It is understood that in some embodiments the invention, which is intended to prevent unintentional separation of the first holding element 6 when the supporting device is subjected to too great an acceleration, also applies to a first holding element 6 which is not urged towards a close position but which can simply be arranged in multiple stable positions for example by means of a rack or the like.

The support device 1 further comprises a blocking device 30, shown in FIGS. 2 to 5, arranged to prevent unintentional movement of the first holding element 6 when the support device 1 is subjected to a blocking acceleration greater than or equal to a predetermined acceleration, as now to be described.

The blocking device 30 comprises a blocking element 32 mounted on the first holding element 6 and movable relative to it between a release position (FIGS. 3 and 4), in which the blocking element 32 allows movement of the first holding element 6 relative to the receiving surface 4, and a blocking position (FIG. 5), in which the blocking element 32 prevents movement of the first holding element 6 relative to the receiving surface 4.

For example, the blocking element 32 is mounted on the first holding element 6 so that it can be rotated about a rotation axis R between the release position and the blocking position. According to the embodiment shown in FIGS. 2 and 3, the rotation axis R passes through one end 34 of the blocking element 32, which is received in a groove 36 of the first holding element 6. In particular, the blocking element 32 comprises at least one pin 38 extending to the end 34, the pin 38 being received rotatably about the rotation axis R in the groove 36 formed in the sliding element 20 of the first holding element 6. The pin 38 thus both attaches the blocking element 32 to the first holding element 6 and ensures the mobility of the blocking element 32 relative to the first holding element 6. With the blocking element 32 being attached to the first holding element 6, it is understood that the blocking element 32 moves with the first holding element 6 when the latter is moved with respect to the receiving surface 4. According to the embodiment shown in FIGS. 2 and 3, the blocking element 32 comprises two pins 38 aligned along the rotation axis R and each received in two corresponding grooves 38 of the first holding element 6. The pins 38 are, for example, clipped into the corresponding grooves 36.

Figure 4:
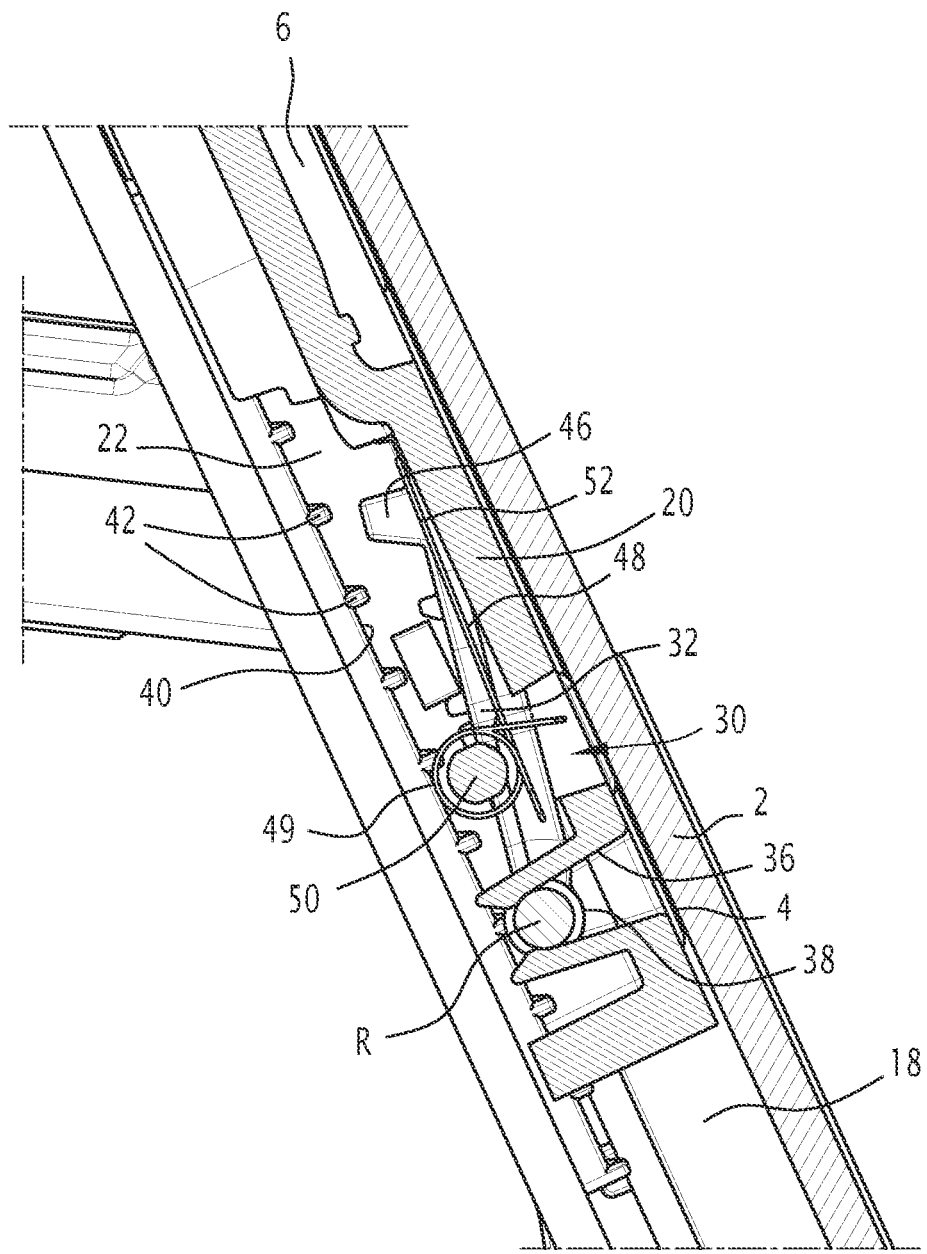
FIG. 4 is a diagrammatical sectional view along axis IV-IV of FIG. 2, with the blocking device in an unlocked position.
Figure 5:
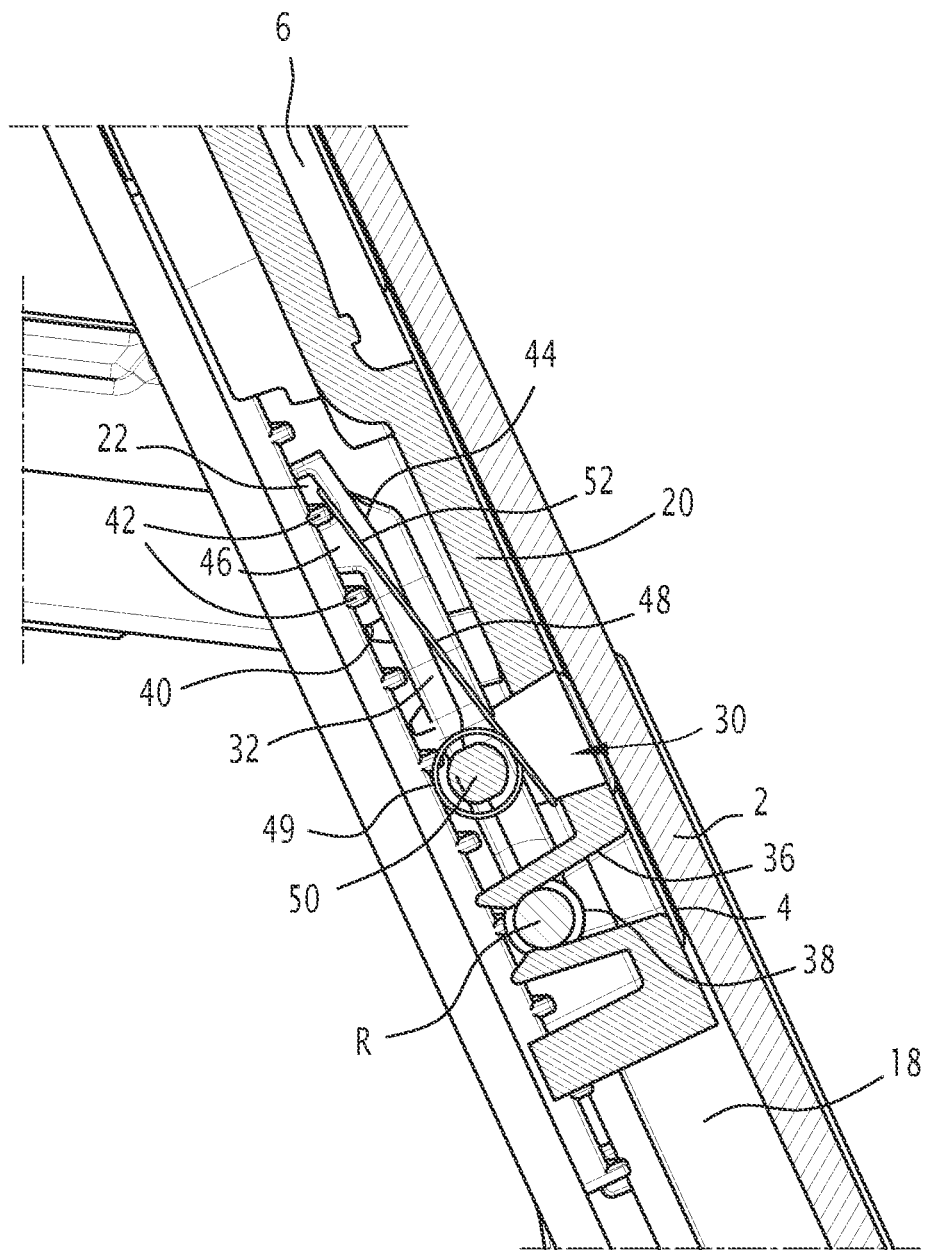
FIG. 5 is a diagrammatical sectional view similar to FIG. 4, with the blocking device in a locked position.

In the blocking position, the blocking element 32 interacts with a blocking surface 40 so that the first holding element 6 is prevented from moving relative to the receiving surface 4. The blocking surface 40 is, for example, firmly connected to the receiving surface 4. For this purpose, the blocking surface 40 is, for example, formed on an inner wall of the body 18 forming the receiving surface 4 so that the blocking surface 40 extends into the sleeve 22 opposite the blocking element 32. In particular, the blocking surface 40 extends in the direction of movement of the first holding element 6 when it is moved relative to the receiving surface 4 and has sufficient length in this direction that the blocking element 32 can interact with the blocking surface 40 regardless of the position of the first holding element 6 relative to the receiving surface 4. For example, the blocking surface 40 comprises multiple complementary blocking elements 42 spaced apart in the direction of movement of the first holding element 6, with blocking element 32 interacting with at least one of these complementary blocking elements 42 in the blocking position of the blocking device 30. When the first holding element 6 is translationally movable, the complementary blocking elements 42 are thus spaced from each other in the direction of translational movement of the first holding element. As shown in FIGS. 4 and 5, the complementary blocking elements 42 are formed by notches projecting from the blocking surface 40 towards the blocking element 32. Alternatively, the complementary blocking elements are formed by notches extending into the blocking surface 40. The free end 44 of the blocking element 32, opposite the end 34 through which the rotation axis R passes, is arranged to interact with at least one of the complementary blocking elements 42 in the blocking position. For this purpose, the free end 44 comprises, for example, at least one pin 46 extending towards the blocking surface 40 and arranged to come to rest against one of the complementary blocking elements 42 or to be inserted into one of the complementary blocking elements 42 or to be retained between two adjacent complementary blocking elements 42 in the blocking position, as shown in FIG. 5. In the release position, the blocking element 30 is moved away from the blocking surface 40 so that the pin 46 does not interfere with the complementary blocking elements 42, allowing the first holding element 6 to move freely with respect to the blocking surface 40 and thus with respect to the holding surface 4. When moving from the release position to the blocking position, the free end 44 of the blocking element 32 moves closer to the blocking surface 40 by rotating the blocking element 32 around the rotation axis R until the pin 46 interacts with at least one of the complementary blocking elements 42. The interaction of the pin 46 with at least one of the complementary blocking elements 42 is arranged in such a way that the movement of the first holding element 6 relative to the receiving surface 4 is prevented as long as this interaction is effective.

As mentioned above, the blocking device 30 is arranged to move into the blocking position when the support device 1, and in particular the first holding element 6, is subjected to a blocking acceleration greater than or equal to a predetermined acceleration. This predetermined acceleration corresponds, for example, to an acceleration that can move the first holding element 6 away from the receiving surface 4 without the intervention of a user. Such separation is achieved in the embodiment described above against the force exerted by the return element(s) 26 on the first holding element 6. In others words, according to this embodiment, the predetermined acceleration corresponds to an acceleration which can overcome the force exerted by the return element(s) 26 on the first holding element 6. For example, the support device is capable of undergoing such a blocking acceleration in the event of impact against the vehicle. For example, the blocking acceleration is greater than or equal to 7G, that is, greater than or equal to seven times the acceleration of gravity on the surface of the earth.

In order to ensure that the blocking device only moves into its blocking position when the support device 1 undergoes a blocking acceleration, the blocking element 32 is urged towards the unblocking position by at least one constraint element 48, whereby the constraint element 48 exerts a urging force on the blocking element 32 which is only overcome by the blocking acceleration. Thus, the change to the blocking position is made against the urging force exerted by the constraint element 48 on the blocking element 32. For example, the constraint element 48 is formed by a spring mounted on at least one pin 50 of the first holding element 6 and comprising an arm 52 applying the urging force to the blocking element 32. According to the embodiment shown in the figures, and as more particularly visible in FIG. 3, the constraint element 48 is mounted by its two ends 49 around two pins 50 of the sliding element 20 of the first holding element 6, with the two pins 50 extending on either side of the blocking element 32. The arm 52 extends between the two ends 49 of the constraint element 48 and rests against the blocking element 32 in the vicinity of the pin 46, with the arm 52 tending to move the blocking element 32 away from the blocking surface 40. For example, the pins 50 of the slide element extend opposite a central part of the blocking element 32 that extends between the rotation axis R and the free end 44, with the arm 52 having a U-shape between the two ends 49 of the constraint element 48, the legs of the U extending between the pins 50 of the slide element 20 and the free end 44 of the blocking element 32, and the base of the U resting against the free end 44 of the blocking element 32, as shown in FIG. 3. It is understood that the constraint element 48 could be arranged differently and have a different shape. As an example, the constraint element 48 could be formed by a spring mounted in a groove 36 around a pin 38 of the blocking element 32. Alternatively, several constraint elements 48 could be provided to urge the blocking element 32 towards the blocking position.

As described above, the constraint element 48 is dimensioned so that the urging force it exerts on blocking element 32 is only overcome when the support device 1 undergoes a blocking acceleration. For this purpose, constraint element 48, for example, has a stiffness between 0.85 N/mm and 1.15 N/mm, preferably 1 N/mm.

In addition, the behavior of blocking element 32 can be adjusted in relation to the urging force exerted by constraint element 48 by adjusting the position of its center of gravity. To do this, the blocking element 32 comprises, for example, a reinforcement element 54 extending between the rotation axis R and the free end 44 of the blocking element so that the distance between the rotation axis R and the reinforcement element 54 can be selected to adjust the position of the center of gravity of blocking element 32 relative to the rotation axis R according to the urging force exerted by the constraint element 48. The reinforcement element 54 extends, for example, into the central part of blocking element 32. According to the embodiment shown in FIGS. 2 and 3, the reinforcement element 54 is, for example, formed by a metal insert fixed on the blocking element 32.

Under normal conditions of use, the support device 1 can accommodate a nomad electronic device 2 by moving the first holding element 6 away from the receiving surface 4 to place the device against the receiving surface 4 and by moving the holding element 6 closer to the receiving surface 4 to place it against the corresponding edge of the nomad electronic device 2. When the first holding element 6 is forced towards the close position, this is done simply by releasing the holding element 6. These movements of the holding element 6 are done while the blocking device is in the unlocked position and the blocking element 32 does not interact with the blocking surface 40. Similarly, a user can remove the nomad electronic device 2 from the holding device 2 by moving the holding element 6 away from the receiving surface 4.

When the support device 1 is subjected to a blocking acceleration, e.g., in the event of a shock or collision, the blocking element 32 moves to the blocking position and interacts with the blocking surface 40 regardless of the position of the first holding element 6 relative to the receiving surface 4. In this blocking position, any movement of the first holding element 6 relative to the receiving surface 4 is prevented so that the nomad electronic device 2 is firmly held on the support device 1 when it is subjected to the blocking acceleration. This blocking is maintained as long as the blocking acceleration is applied to the support device 1. When the support device 1 is no longer subjected to the blocking acceleration, the blocking device returns to the unblocking position under the effect of the constraint element 48 so that the support device 1 can be used normally again.

The above description has been made with reference to a single movable holding element. It is understood, however, that the invention could also apply to the second holding element if it is made movable relative to the holding surface, by providing a blocking device as described above between the second holding element and the body 18 forming the receiving surface. The invention could also apply if the entire receiving surface was movable relative to an element bearing that receiving surface by providing a blocking device as described above between the receiving surface and that element. The invention could also be applied to a holding element that is rotatable relative to the receiving surface.

The invention claimed is:

1. A support device for a nomad electronic device for a vehicle, comprising a receiving surface for the nomad electronic device, a first holding element and a second holding element arranged to be respectively applied against two opposite edges of the nomad electronic device for holding said nomad electronic device on the receiving surface, at least the first holding element being movable relative to the receiving surface so that the distance between the first holding element and the second holding element is adjustable, the holding device further comprising a blocking device having at least one blocking element movable between a release position, in which movement of the first holding element relative to the receiving surface is permitted, and at least one blocking position, in which movement of the first holding element relative to the receiving surface is prevented, the blocking device further comprising at least one constraint element exerting an urging force on the blocking element urging the blocking element towards its unblocking position, the blocking element moving to its blocking position against the urging force exerted by the constraint element when the support device is subjected to a blocking acceleration greater than or equal to a predetermined acceleration, wherein the blocking element interacts with a blocking surface in the blocking position, said blocking surface comprising multiple complementary blocking elements spaced from each other in the direction of movement of the first holding element, the blocking element interacting with at least one of said complementary blocking elements in the blocking position so as to prevent movement of the first holding element relative to the receiving surface regardless of the position of the first holding element relative to the receiving surface.

2. The support device according to claim 1, wherein the first holding element is translationally movable relative to the receiving surface, the blocking device being translationally movable with the first holding element so as to allow blocking of movement of the first holding element relative to the receiving surface in all positions of the first holding element when the support device is subjected to blocking acceleration.

3. The support device according to claim 2, wherein the complementary blocking elements of the blocking surface are spaced from each other in the direction of translational movement of the first holding element.

4. The support device according to claim 1, wherein the blocking element is rotatable about an axis of rotation relative to the first holding element between the release position and the blocking position so that the free end of the blocking element opposite the rotation axis approaches the blocking surface as the blocking element moves from the release position to the blocking position.

5. The support device according to claim 4, wherein the blocking element comprises a reinforcing element extending between the rotation axis and the free end of the blocking element, said reinforcing element being spaced from the rotation axis to adjust the position of the center of gravity of the blocking element relative to the rotation axis as a function of the urging force exerted by the constraint element on the blocking element.

6. The support device according to claim 4, wherein the constraint element is mounted on at least one pin of the first holding element extending opposite a central portion of the blocking element between the rotation axis and the free end of the blocking element, the constraint element comprising an urging arm exerting the urging force on the free end of the blocking element.

7. The support device according to claim 4, wherein the blocking element comprises at least one pin rotatably mounted in a groove of the first holding element about the rotation axis of the blocking element.

8. The support device according to claim 1, further comprising a return element urging said first holding element towards a position close to the receiving surface, the displacement of the first holding element away from the receiving surface being made against the force exerted by said return element on the first holding element.

9. The support device according to any one of claim 1, wherein the second holding element is fixed relative to the receiving surface and projects from one edge of said receiving surface, the first holding element being movable relative to the opposite edge of the receiving surface.

10. A holding device according to claim 1, wherein the blocking acceleration is greater than or equal to 7G.

* * * * *